No. 716,394. Patented Dec. 23, 1902.
W. B. H. DOWSE.
FASTENER.
(Application filed July 11, 1900.)
(No Model.)
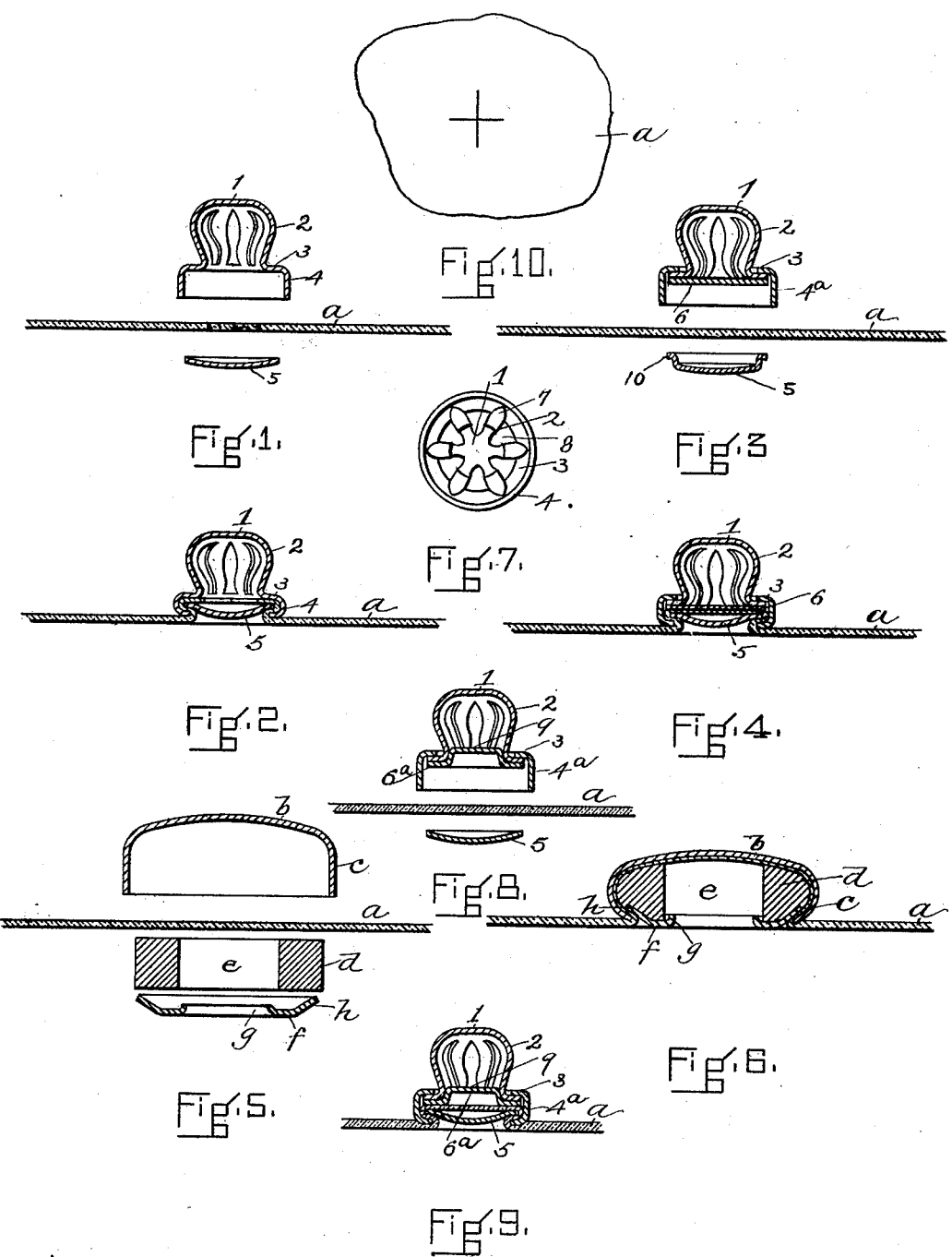

UNITED STATES PATENT OFFICE.

WILLIAM B. H. DOWSE, OF NEWTON, MASSACHUSETTS.

FASTENER.

SPECIFICATION forming part of Letters Patent No. 716,394, dated December 23, 1902.

Application filed July 11, 1900. Serial No. 23,201. (No model.)

*To all whom it may concern:*

Be it known that I, WILLIAM B. H. DOWSE, of Newton, in the county of Middlesex and State of Massachusetts, have invented a new and useful Improvement in Fasteners, of which the following, taken in connection with the accompanying drawings, is a specification.

My invention relates to the art of manufacturing snap-fasteners and applying the same to the materials of garments, gloves, &c.; and it consists in improvements in that class of snap-fasteners wherein the clenching parts of each member may be applied and secured to each other without necessitating previous perforation of the material whereon the fastener is to be used.

In the drawings hereto annexed, which illustrate an embodiment of my invention, Figures 1 and 2 show in cross-section a snap-fastener stud member before and after application to material, respectively. Figs. 3 and 4 show in cross-section a modification of the stud member before and after application, respectively. Figs. 5 and 6 show a snap-fastener socket member in cross-section before and after application to material, respectively; and Fig. 7 is a bottom view of the stud shown in Fig. 3 with a portion removed. Figs. 8 and 9 show a further modification of the stud member before and after application, respectively. Fig. 10 shows the method of treatment of the fabric to which the fastening is to be applied, whether stud or socket member, where the fabric is of a heavy or inflexible kind.

The fastener as a whole consists of a stud member and a socket member adapted to mutual engagement. Each member is secured to a flap or edge of the garment or material with which the fastener is used, and either or both of the members are made elastic, so that their mutual engagement is characterized by the well-known springing or snapping together of the two members. Usually one only of the two members is made resilient, and the resiliency may reside either in the socket or the stud. My invention is adapted to embodiment in a fastener of either kind. It is necessary to describe an example only of one kind, and I therefore describe a fastener wherein the stud is resilient and the socket solid or non-resilient.

The stud member (shown in Figs. 1 to 4, inclusive, and partly in Fig. 7) comprises a stud 1, provided with bars 2, radiating from a common center and cupped to shape, which gives it a "bird-cage" appearance, a base 3, which terminates in a downturned flange 4, said flange and base 3 forming a receiving-angle, and a bottom plate 5, which consists of a simple disk or flat ring, preferably slightly dished or concaved. The edges of the flange 4 and bottom plate 5 should be rounded or smoothed, so as not to abrade the material to which the stud is attached. If extreme cheapness is essential, these parts 4 and 5 may be left with the edges made by the usual metal-working tools; but this increases the possibility of injury to the material. As is obvious, the stud 1, having bars 2 or the equivalent alternate forms hereinafter described, forms what may be termed a "skeleton spring-stud" portion. In Figs. 3 and 4 a modification of the stud member is shown. When for the sake of facility in manufacture it is desirable to make the stud-top in two pieces, the bird-cage bars may be left with free ends. In this case the base-piece 3 is made annular by a perforation or open center 8, Fig. 7, into which the free ends of the cage-bars 7 are inserted and afterward spread out radially. In order to prevent the ends of the bars from drawing out under the strains of use, I provide a supporting-plate 6, Fig. 3, which fits within the flange 4ª and reinforces the free ends of the cage-arms 2 and holds them against accidental displacement under lateral strains. If it is desired still further to secure the anchorage of the cage-arms, I provide a supporting-plate 6ª, such as shown in Figs. 8 and 9. This plate instead of being a plain disk, as in Figs. 2 and 3, (or a plain flat ring, which would serve quite as well and operate in the same manner as the disk 5 of Figs. 2 and 3) is struck up centrally, so as to form a crown 9, which should fit snugly inside the cage-arms 2. I have shown the bottom plate 5 in Fig. 3 provided with what I call "hooking edges" 10, which facilitate the grip of the material and the joining of the flange 4 to said bottom plate. In attaching this stud member to the material $a$ it is not necessary to perforate the material. The stud part of the stud member is presented to the material on one side and the bottom plate 5 to the other side, as in Figs. 1, 3, and 8. Then by means of a proper die or press the plate 5 and the material engaged thereby are pressed into the cup formed by the flange 4, and the flange 4 is compressed or clenched under the edge of the plate 5 and the material included between the flange and cup. The final condition of the stud member is shown in Figs. 2, 4, and 9. The stud member thus formed is adapted for use with any of the well-known socket members heretofore in use, which are susceptible of being made of any desired proportions.

The special socket member which I have invented is shown in Figs. 5 and 6. This consists of a dome or cap $b$, provided with a downturned flange $c$. A filling $d$, having a central chamber or perforation $e$ and a stud-receiving throat-plate $f$, both adapted to enter the flange $c$ of the dome $b$, are presented to the material $a$ on the side opposite the dome $b$. The filling $d$ serves to reinforce and give shape to the dome $b$ in its final condition, the perforation $e$ provides a proper chamber for the reception of a stud-head, as 1, Figs. 2, 4, and 9, and the throat-plate $f$, with its central opening or perforation $g$, serves to receive and retain the stud-head. In attaching this socket member to the material $a$ the upper and lower parts are presented to each other, as in Fig. 5, with the material $a$ between them. As in the case of the stud member, no preparatory perforation of the material $a$ is necessary. By means of a proper tool or press the filling $d$ and throat-plate $f$ are forced into the hollow of the dome $b$, carrying the flexible material $a$ with them. Then the flange $c$ is crimped or rolled under the edge $h$ of the throat-plate $f$, securing all the parts to each other and to the material $a$. The socket member above described may be used with studs differing in construction and mode of application from that shown in the several figures herein.

The complete fastener is composed of both the stud and socket members, which, constructed as above described, possess every requisite of serviceability, comeliness, and strength, which are indispensable to a commercial article and are, moreover, unusually easy of application to garments and fabrics.

I have discovered that this method of fastening, consisting of applying plates to an imperforate material, is nearly impossible where the material is of a heavy stiff nature, like heavy duck or heavy leather. In those cases I simply weaken the material by cross cuts at the spot where either the material or fabric member is to be attached, as shown in Fig. 10. By doing this I have discovered that the material adapts itself to the interior of the member and lies in a smooth manner on the outer edge of the fastening.

What I claim, and desire to secure by Letters Patent, is—

1. A snap-fastener stud member comprising a bird-cage stud with free end bars, a centrally-perforated base provided with a peripheral downturned flange, the stud mounted on the base with the ends of the cage-bars turned outward and reinforced by a supporting-plate within the base, the supporting-plate, and a bottom plate adapted to fit within the said flange, the stud and bottom plate applied to each other on opposite sides of imperforate flexible material, the flange clenched around the bottom plate and confined material, substantially as described.

2. A snap-fastener socket member, comprising a dome with a peripheral downturned flange, a centrally-perforated filler adapted to fill the dome circumferentially, and a throat-plate adapted to receive and retain a stud, the dome, and the filler with the throat-plate, respectively, applied to each other on opposite sides of flexible imperforate material, and the dome-flange clenched under the filler, throat-plate, and confined material, substantially as described.

3. A snap-fastener comprising a stud member and socket member, one of which at least is resilient, the stud member comprising a stud mounted upon a base, the base provided with a peripheral downturned flange, and a bottom plate adapted to fit within the said flange, the stud and bottom plate applied to each other on opposite sides of imperforate flexible material, the flange clenched around the bottom plate and confined material; and the socket member comprising a dome with a peripheral downturned flange, a centrally-perforated filler adapted to fill the dome circumferentially, and a throat-plate, adapted to receive and retain the stud, the dome, and the filler with the throat-plate, respectively, applied to each other on opposite sides of flexible imperforate material, and the dome-flange clenched under the filler, throat-plate, and confined material, substantially as described.

4. A snap-fastener stud member comprising a bird-cage stud with free end bars, a centrally-perforated base provided with a peripheral downturned flange, the stud mounted on the base with the ends of the cage-bars turned outward and reinforced by a supporting-plate within the base, the supporting-plate consisting of a centrally-struck-up disk, the central portion of which enters between the cage-bars, and a bottom plate, adapted to fit within the said flange, the stud and bottom plate applied to each other on opposite sides of imperforate flexible material, the flange clenched around the bottom plate and confined material, substantially as described.

5. A snap-fastener stud member comprising a bird-cage stud with free end bars, a centrally-perforated base with a peripheral downturned flange, a supporting-plate within the base in combination with a bottom plate having upturned hooking or connecting edges applied on the opposite side of the material to which the member is attached, all substantially as shown and described.

In testimony whereof I have signed my name to this specification, in the presence of two subscribing witnesses, on this 28th day of June, A. D. 1900.

WM. B. H. DOWSE.

Witnesses:
A. H. FLANNERY,
G. W. PHILLIPS.